(12) United States Patent
Liu

(10) Patent No.: US 6,474,811 B2
(45) Date of Patent: Nov. 5, 2002

(54) SPECTACLE FRAME COMBINATION OF A PRIMARY LENSES FRAME AND AN AUXILIARY LENSES FRAME MAGNETICALLY AND PIVOTABLY ATTACHED THERETO

(75) Inventor: Ting Kin Liu, Kowloon (HK)

(73) Assignee: Genuine International Investment Limited, Kowloon (HK)

( * ) Notice: Subject to any disclaimer, the term of this patent is extended or adjusted under 35 U.S.C. 154(b) by 0 days.

(21) Appl. No.: 10/072,882

(22) Filed: Feb. 12, 2002

(65) Prior Publication Data

US 2002/0089640 A1 Jul. 11, 2002

Related U.S. Application Data

(63) Continuation of application No. PCT/CN99/00118, filed on Aug. 16, 1999.

(51) Int. Cl.⁷ .............................................. G02C 9/00
(52) U.S. Cl. .......................................... 351/47; 351/57
(58) Field of Search ................................ 351/47, 48, 57, 351/58

(56) References Cited

U.S. PATENT DOCUMENTS

| | | | | | |
|---|---|---|---|---|---|
| 5,243,366 | A | * | 9/1993 | Blevinns ...................... | 351/57 |
| 5,376,977 | A | * | 12/1994 | Liu .............................. | 351/47 |
| 5,882,101 | A | * | 3/1999 | Chao ........................... | 351/47 |
| 6,364,478 | B1 | * | 4/2002 | Jagasia ........................ | 351/47 |

* cited by examiner

Primary Examiner—Huy Mai
(74) Attorney, Agent, or Firm—Nath & Associates PLLC; Harold L. Novick

(57) ABSTRACT

A spectacle frame combination having an auxiliary lenses frame magnetically and pivotably attached to a primary lenses frame. The primary lenses frame has an integral magnetic portion generating a magnetic field on both an inner and an outer surface of a temple member. The auxiliary frame may be attached to either the inner or outer surface of the primary frame by the cooperation of magnetic end portions of the auxiliary frame with complementary magnetic portions of the primary frame.

4 Claims, 7 Drawing Sheets

SPECTACLE FRAME COMBINATION OF A PRIMARY LENSES FRAME AND AN AUXILIARY LENSES FRAME MAGNETICALLY AND PIVOTABLY ATTACHED THERETO

This application is a Continuation of International Patent Application No. PCT/CN99/00118 with an International filing date of Aug. 16, 1999, the entire contents of the application which is hereby incorporated in its entirety.

BACKGROUND OF THE INVENTION

The present invention relates to spectacle or eyeglass frames; and, more particularly, to a combination of a primary frame and an auxiliary frame magnetically attachable to one another. The auxiliary frame may be attached to either the inner surface or outer surface of the primary frame temple member and be pivotable from a first position to a second position.

The prior art teaches that magnetic mechanisms may be used to affix or position auxiliary eyeglass frames to a primary eyeglass frame. Various mechanisms are shown in U.S. Pat. Nos. 5,568,207; 5,243,366; 5,181,051; 4,196,981; and 4,070,103. However, none of the prior art teaches or discloses an integral magnetic mechanism for enabling the auxiliary frame to be attached on either the inner or outer surface of the temple member of the primary frame and still allow the auxiliary frame to be pivoted upward away from a parallel alignment of the lenses of both the primary and auxiliary frame.

SUMMARY OF THE INVENTION

A spectacle frame combination including an auxiliary lenses frame magnetically and pivotably attachable to a primary lenses frame. The rearwardly extending temple members of the primary frame each incorporate an integral magnetic section which generates a magnetic field along both the outer and inner surfaces of a front section of the temple member forward the temple hinge. The auxiliary frame has rearwardly extending g engagement arms which each incorporate an integral magnetic portion for rotatable attachment to complimentary sections of the integral magnetic portion of the front section of the temple members.

DETAILED DESCRIPTION OF THE PREFERRED EMBODIMENT

Figure 1A:
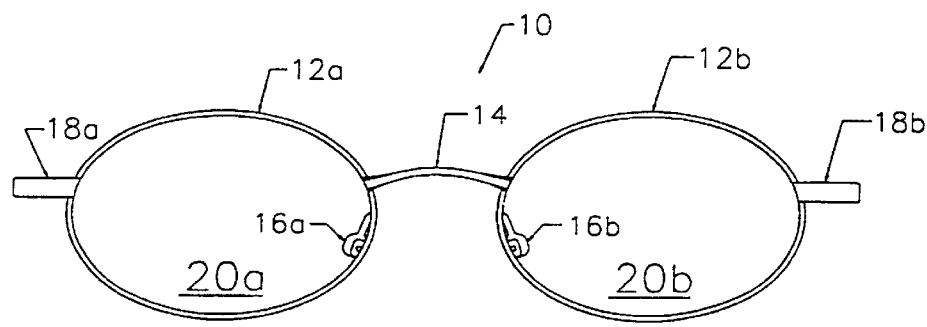
FIG. 1A is a front elevation view of the primary lenses frame of the present invention.

FIG. 1A illustrates a front elevation view of the primary lenses frame of the present invention. Primary frame 10 has the conventional eyepiece rims 12a and 12b and lenses 20a and 20b. These may be any shape desired by the designer or wearer. The rims are joined by bridge 14 and are provided with nose pieces 16a and 16b. Also seen in FIG. 1A are the face sections 18a and 18b of the hinged temple members of the frame.

Figure 1B:
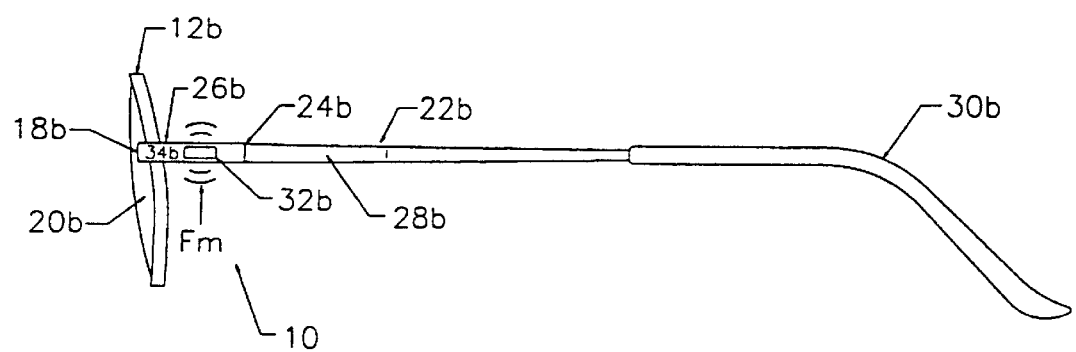
FIG. 1B is a side elevation view of the primary lenses frame of the present invention.

A side elevation view of the frame 10 is shown in FIG. 1B. Lens member 20b is affixed in rim 12b. The side temple member 22b is L-shaped and extends generally rearwardly from the front of the frame 10. A hinge 24b connects a front section 26b and rear section 28b of the temple member 22b. An ear section 30b completes the distal section of the temple member.

Attention is directed to the front section 26b forward of hinge 24b. An integral primary magnetic portion 32b is formed along the front section 26b of the temple member 22b. Magnetic portion 32b generates a magnetic field $F_m$ along both the inner 33b and outer surfaces 34b of the front section 26b.

Figure 1C:
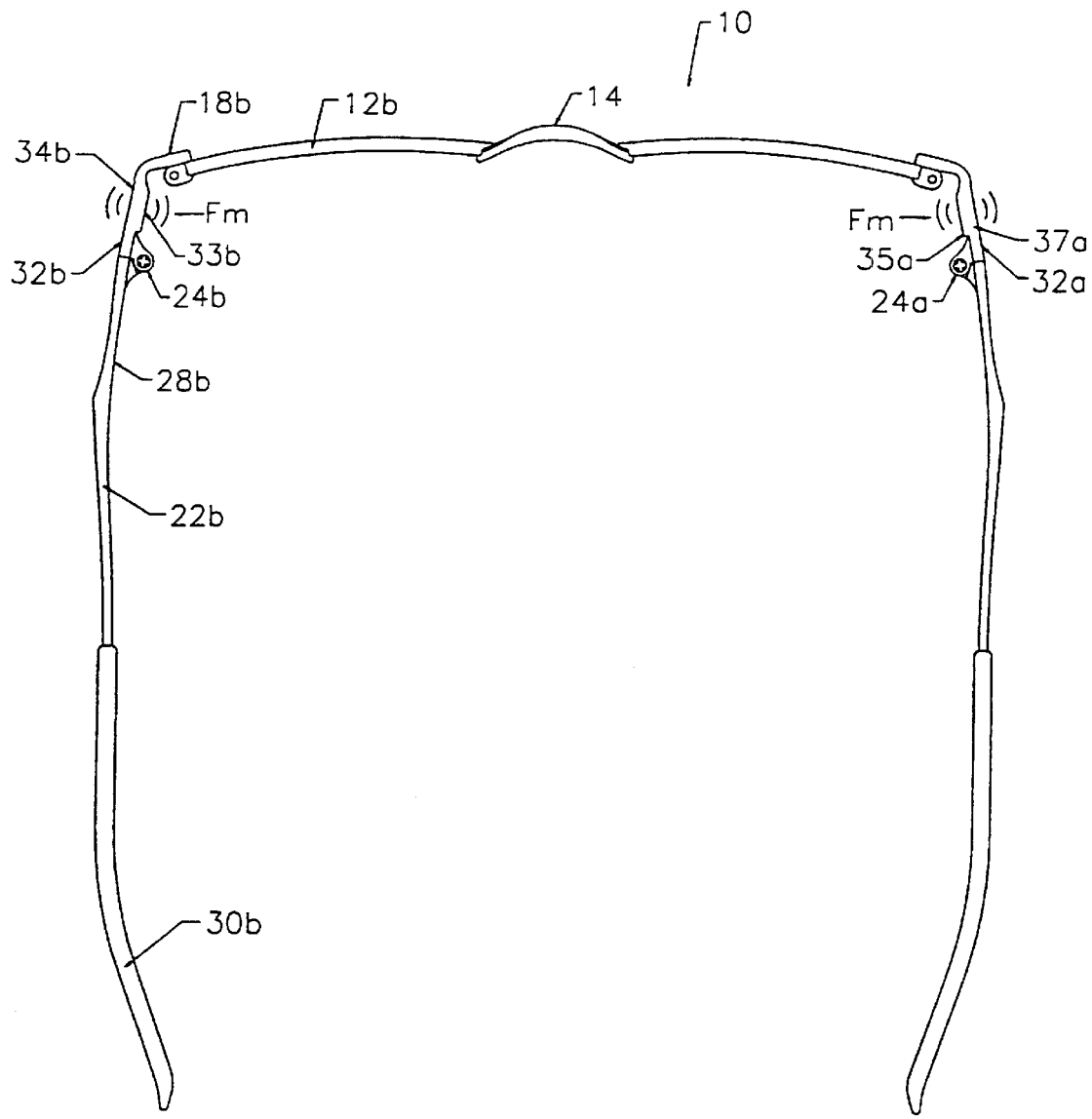
FIG. 1C is a top plan view of the primary lenses frame of the present invention.

FIG. 1C is a top plan view which illustrates that primary magnetic portions 32a and 32b of the temples generate a magnetic field $F_m$ on the inner surfaces 35a and 33b and the outer surfaces 37a and 34b of the front sections 32a and 32b.

Figure 2A:
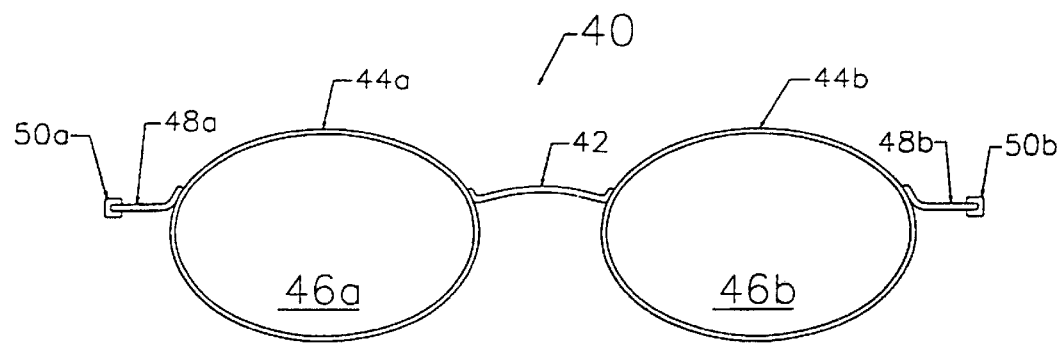
FIG. 2A illustrates a front elevation view of one embodiment of the auxiliary lenses frame of the present invention.
Figure 2B:
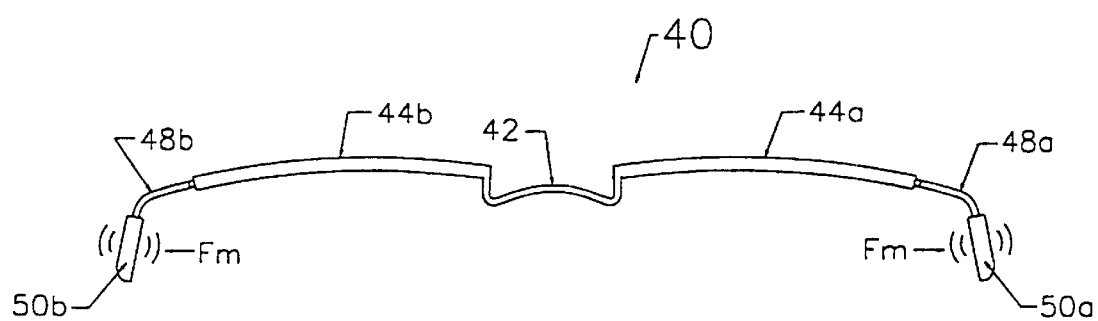
FIG. 2B illustrates a top plan view of the embodiment of FIG. 2A of the present invention.

Turning to FIGS. 2A and 2B, one embodiment of the auxiliary lenses frame 40 of the present invention is shown. Again, a bridge 42 connects the eyepiece rims 44a and 44b. The rims are designed to retain and support auxiliary lenses 46a and 46b. Extending outwardly and rearwardly are L-shaped, engagement arms 48a and 48b. At the distal end of each arm is an integral auxiliary magnetic portion 50a and 50b which cooperates with complimentary primary magnetic portions 32a and 32b of the primary frame 10 to rotatably secure and retain the auxiliary frame 40 to the primary frame 10.

Figure 3A:
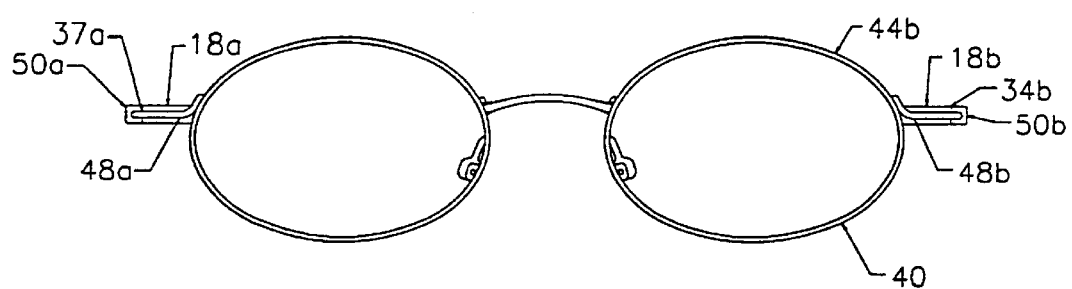
FIG. 3A shows a front elevation view of the combination of the present invention with the auxiliary frame of FIG. 2A.
Figure 3B:
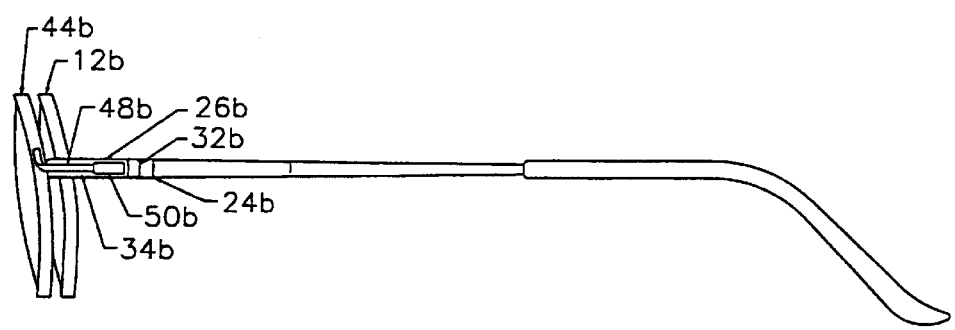
FIG. 3B shows a side elevation view of the combination of the present invention with the auxiliary frame of FIG. 2A in a first position.
Figure 3D:
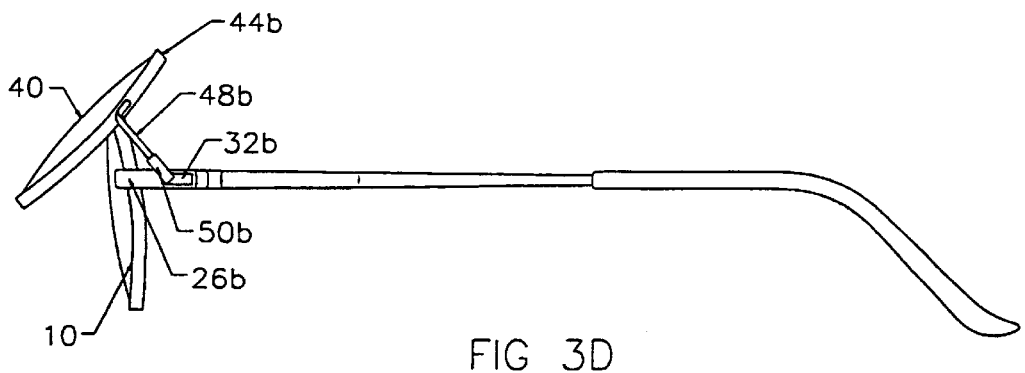
FIG. 3D shows a top plan view of the combination of the present invention with the auxiliary frame of FIG. 2A in a second position (in broken lines).
Figure 3C:
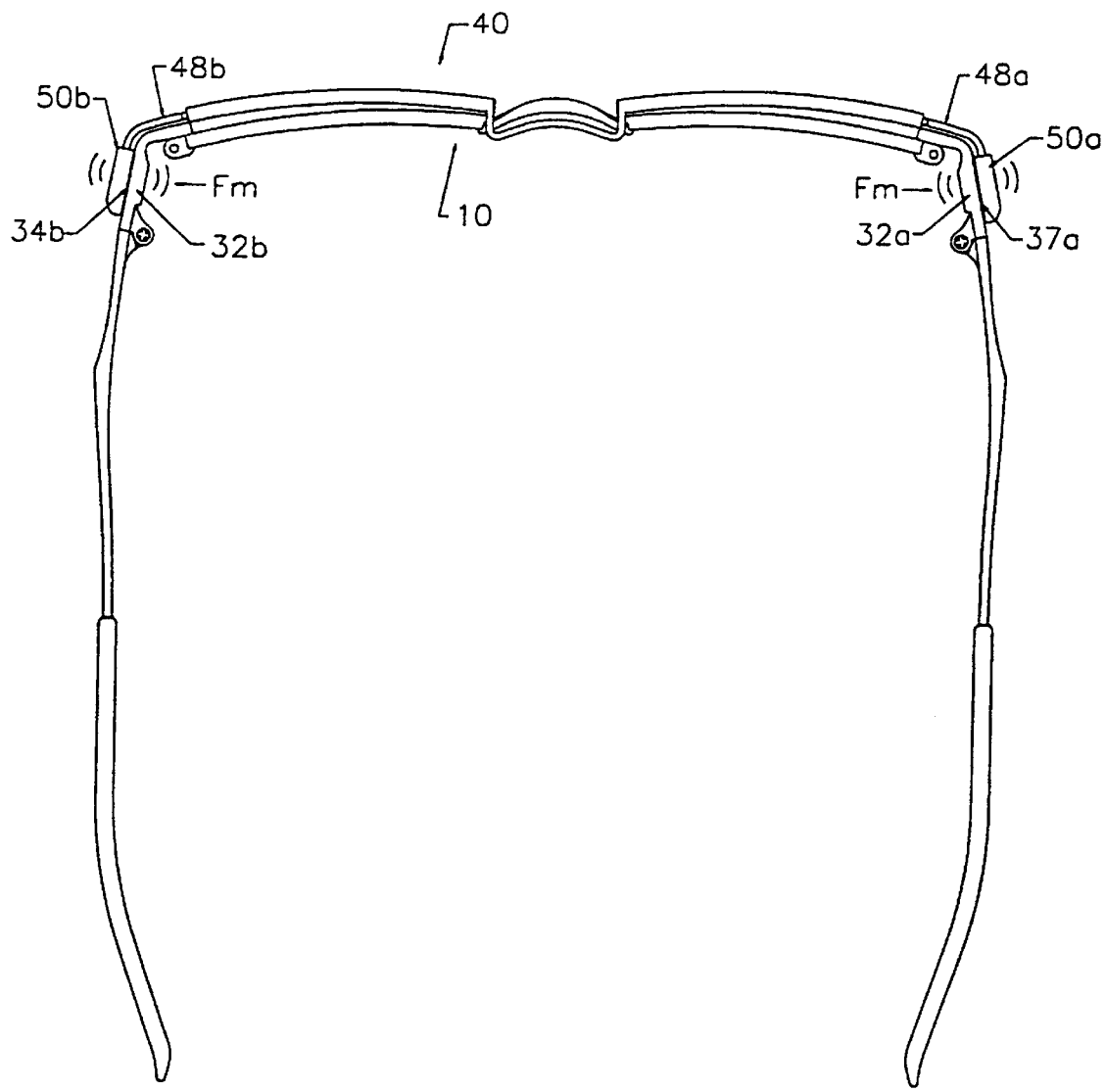
FIG. 3C shows a top plan view of the combination of the present invention with the auxiliary frame of FIG. 2A.

The combination of the present invention is shown in FIGS. 3A–3D. In FIG. 3A a front elevation view shows the auxiliary frame 40 attached to the primary frame 10. Engagement arms 48a and 48b extend over and around face sections 18a and 18b and engage integral auxiliary magnetic portion 50a and 50b with outer surfaces 34b and 37a of integral magnetic portions 32b and 32a, respectively. FIG. 3B shows a side elevation view of the combination with engagement arm 48b extending along outside surface 34b of frame 10. Auxiliary magnetic portion 50b is magnetically coupled to primary magnetic portion 32b as a result of the cooperation of the complimentary magnetic portions. FIG. 3C is a top plan view illustrating the engagement of the auxiliary magnetic portions 50b and 50a with the outside surface 34b and 37a, respectively, of the front sections 26b and 26a.

FIG. 3D illustrates that the auxiliary lenses frame 40 (shown in broken lines for clarity) may be rotated about the magnetic attachment. Because the magnetic fields $F_m$ extend outwardly from the surfaces of the parts, there is no need for the precise fit necessary in prior art devices. FIG. 3D shows that magnetic portion 50b has engaged primary magnetic portion 32b at a forward edge of the portion 32b.

Thus, the auxiliary spectacle lenses frame 40 may be rotated from a first down position in which the primary lenses 20a and 20b and the auxiliary lenses 46a and 46b are generally in parallel alignment to a second position where the auxiliary lenses 46a and 46b are generally moved upwardly and out of the line of sight; a position more generally perpendicular to the primary lenses.

As will be described below, this rotational aspect may be achieved even when the auxiliary lenses frame 40 is affixed on the inside surface 35a or 33b of the front section of the temple member.

Figure 4A:
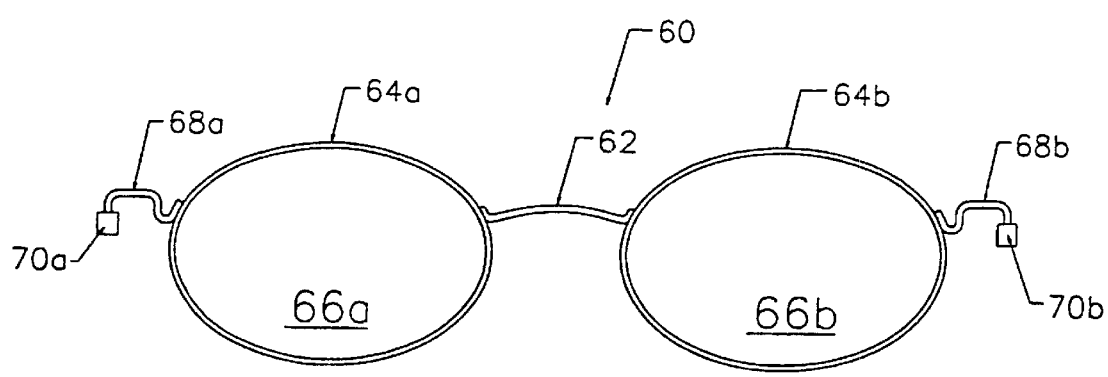
FIG. 4A is a front elevation view of another embodiment of the auxiliary lenses frame of the present invention.
Figure 4B:
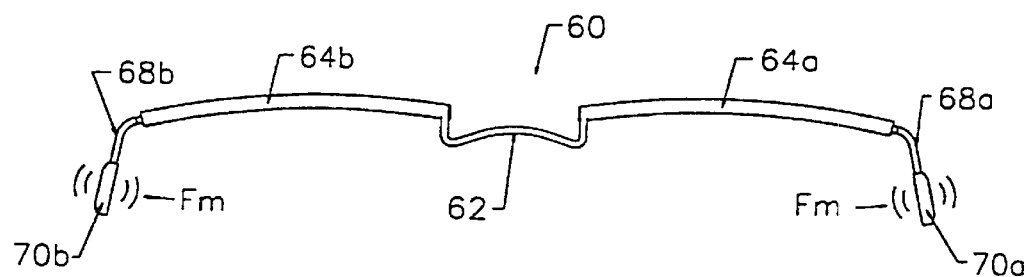
FIG. 4B illustrates a top plan view of the auxiliary lenses frame of FIG. 4A.
Figure 4C:
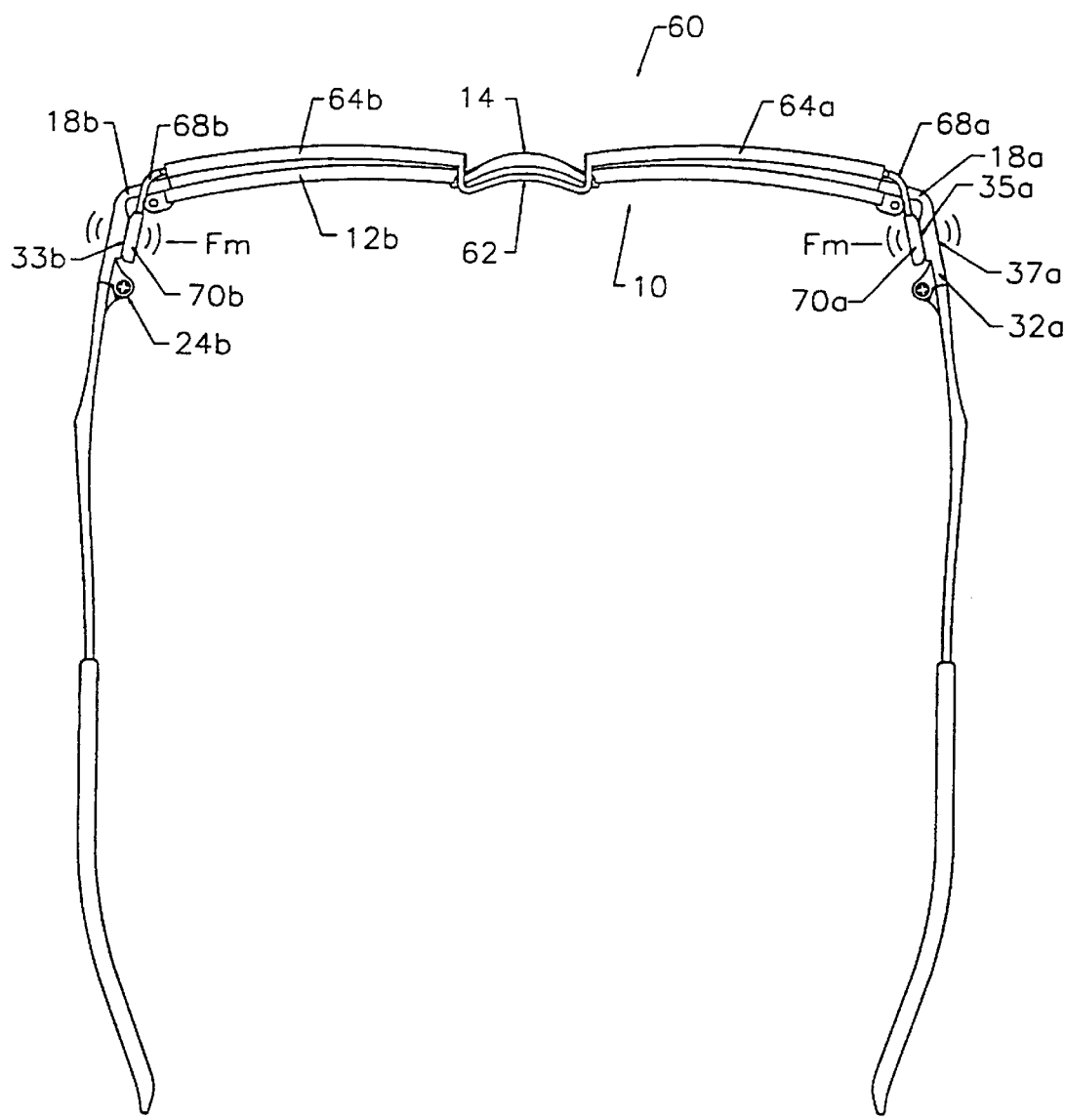
FIG. 4C shows a top plan view of the combination of the present invention with the auxiliary lenses frame of FIG. 4A.

FIGS. 4A–4C show a second embodiment of the auxiliary lenses frame 60 with bridge 62; rims 64a and 64b; engagement arms 68a and 68b; and auxiliary magnetic portions 70a and 70b. FIG. 4C specifically shows how the auxiliary frame 60 engages with primary frame in a top plan view. The auxiliary magnetic portions 70a and 70b rotatably attach to the inner surfaces 33b and 35a of the frame 10. Engagement arms 68a and 68b extend over the top of face sections 18a and 18b of frame 10. Auxiliary frame 60 may be rotated upwardly as previously discussed in the embodiment shown in FIGS. 3A–3D.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

What is claimed is:

1. A spectacle frame combination comprising:

a primary spectacle frame for supporting primary lenses therein, said primary spectacle frame having generally rearwardly extending temple members, each of said temple members having a front section, a rear section, and a hinge member, said front section forward of said hinge separating said front and said rear sections, said front section having an integral magnetic portion along said front section of said temple member and generating a magnetic field along both an outer surface and an inner surface of said front section of said temple member; and an auxiliary spectacle frame for supporting auxiliary lenses therein, said auxiliary spectacle frame having generally rearwardly extending engagement arms, each of said engagement arms having an integral magnetic portion for rotatable magnetic attachment to complimentary sections of said integral magnetic portion of said front section of said temple member.

2. The combination of claim 1 wherein said integral magnetic portion of each of said generally rearwardly extending engagement arms of said auxiliary spectacle frame rotatably attach to an outer surface of said complimentary sections of said integral magnetic portion of said front section of said temple member.

3. The combination of claim 1 wherein said integral magnetic portion of each of said generally rearwardly extending engagement arms of said auxiliary spectacle frame rotatably attach to an inner surface of said complimentary sections of said integral magnetic portion of said front section of said temple member.

4. The combination of claim 1 wherein said auxiliary spectacle frame may be rotated from a first position in which said primary lenses and said auxiliary lenses are generally in parallel alignment to a second position wherein said auxiliary lenses are positioned above and out of a line of sight through said primary lenses.

* * * * *